United States Patent [19]

Lavigne

[11] Patent Number: 4,678,582

[45] Date of Patent: Jul. 7, 1987

[54] TREATMENT SYSTEM FOR LANDFILL LEACHATE

[76] Inventor: Ronald L. Lavigne, Norwich Lake, Huntington, Mass. 01050

[21] Appl. No.: 822,125

[22] Filed: Jan. 24, 1986

[51] Int. Cl.$^4$ .............................. C02F 3/32; C02F 3/04
[52] U.S. Cl. .................... 210/150; 210/602; 210/170; 405/128; 435/262
[58] Field of Search ............... 210/602, 617, 618, 150, 210/151, 611, 610, 747, 170; 405/128; 435/262

[56] References Cited

U.S. PATENT DOCUMENTS

| | | | |
|---|---|---|---|
| 3,728,254 | 4/1973 | Carothers | 210/602 |
| 3,770,623 | 11/1973 | Seidel | 210/602 |
| 4,333,837 | 6/1982 | Plósz et al. | 210/170 |
| 4,406,403 | 9/1983 | Luebke | 210/747 |
| 4,415,450 | 11/1983 | Wolverton | 210/602 |
| 4,473,477 | 9/1984 | Beall | 210/747 |

FOREIGN PATENT DOCUMENTS

| | | | |
|---|---|---|---|
| 58-70891 | 4/1983 | Japan | 210/602 |
| 58-70893 | 4/1983 | Japan | 210/602 |
| 967966 | 10/1982 | U.S.S.R. | 210/602 |

*Primary Examiner*—Benoit Castel
*Attorney, Agent, or Firm*—Blodgett & Blodgett

[57] ABSTRACT

A biological living-filter system for treatment of sanitary landfill leachate which comprises a treatment basin which is lined with a water impervious material and filled with an organically enriched treatment medium which is conducive to maintaining a population of micro-organisms. The system also includes leachate tolerant plants growing in the treatment medium and flow control means for the leachate.

8 Claims, 2 Drawing Figures

4,678,582

TREATMENT SYSTEM FOR LANDFILL LEACHATE

BACKGROUND OF THE INVENTION

1. Field of the Invention:

The present invention generally relates to a system for treatment of sanitary landfill leachate and, more particularly, to a biological living-filter system for reducing the toxicity of sanitary landfill leachate.

2. Setting for the Invention:

When domestic, commercial, and non-hazardous industrial refuse are disposed of by sanitary landfilling, the refuse materials rapidly become exposed to anaerobic conditions. This anaerobic phenomenon often results from the actions of one, or a combination of several factors. First, the earthern cover on a sanitary landfill is poorly permeable to atmospheric oxygen. Second, refuse traditionally contains a predominant amount of biodegradable material, the principal constituent being paper. Aerobic bacterial respiration reduces available oxygen, and atmospheric transfer cannot keep pace with the demand, thereby creating an optimum environment for anaerobesis. Third, warmth, moisture, and darkness promote growth conditions favorable for anaerobes. Although many microbiological species are capable of first stage anaerobic metabolism, they have been collectively referred to as acid formers, sharing the common biochemical pathway of producing organic acids as their metabolites. Acetic acid and propionic acid represent the largest percentage of total metabolities produced. Due to the strong reducing nature of these organic byproducts, heavy metals and other compositions become cationic and readily mobile. This association of organic acids and inorganic materials has been traditionally referred to as landfill leachate. Additionally, leachate pollutants often include such materials as pathogenic bacteria, viruses, pesticides, industrial and wastewater sludges, septage, solvents, and hazardous wastes.

The extent to which leachate is able to leave a landfill location by groundwater or surface water transport has been a point of interest for many years. Studies suggest that in an arid or semiarid climate site, the water transport rates are slow, and, consequently, pollution problems are limited. Conversely, in temperate climate sites, water transport rates are fast and, consequently, leachate pollution presents a serious environmental problem. To prevent aquifer and groundwater contamination by landfill leachate, design criteria for landfills strongly encourage or require construction in soils rich in clay, located above the water table and situated at assumed safe distances from drinking and surface water resources. In spite of these precautions, leachate problems pervade many landfill locations resulting in contaminations of water resources.

More recently, attention has been focused on the concept of lining landfills with impermeable membranes, then collecting and treating leachate either off-site or on-site. Off-site treatment may involve piping the leachate to a nearby sewer system, and combining it with the municipal sanitary sewage. This off-site treatment methodology requires that the community have a municipal treatment facility capable of processing the leachate loadings; and that the concentration of leachate to wastewater be small to effectuate effective processing. For large landfill operations, on-site treatment of leachate with package plants has been attempted; but with limited success. These and other problems experienced with the prior art systems for treatment of landfill have been obviated by the present invention.

Another type of leachate treating sytem includes one or more open oxidation ponds or lagoons. This type of system tends to be relatively slow and requires a relatively large land area. In addition, the open pond is unsightly, has an objectionable odor and is a breeding ground for mosquitoes.

OBJECTIVE OF THE INVENTION

Accordingly, it is a primary object of the present invention to provide a biological living-filter system for treatment of sanitary landfill leachate.

Another object of the invention is the provision of a biological living-filter system for treatment of sanitary landfill leachate so that release of treated leachate into the environment has little or no detectable environmental impact.

A further object of the invention is the provision of a biological living-filter system for treatment of sanitary landfill leachate having a very high % removal of pollutants, in a minimum of treatment time yet, which still is capable of large volume continuous treatment of toxic leachates.

It is another object of the invention to provide a biological living-filter system for treatment of sanitary landfill leachate having low technology requirements.

A still further object of the invention is the provision of a leachate treatment system which requires a relatively small treatment area, is aesthetically pleasing and effectively treats leachate in a relatively short period of time.

With these and other objects in view, as will be apparent to those skilled in the art, the invention resides in the combination of elements and conditions set forth in the specification and covered by the claims appended hereto.

SUMMARY OF THE INVENTION

In general, the invention consists of a biological living-filter system for treatment of sanitary landfill leachate.

Sanitary landfill facilities are utilized to provide for proper waste disposal; however, in recent years a growing problem has been shown to confront sanitary landfill operations, that of, toxic leachate production and its consequential environmental impact. Water entering a sanitary landfill, from precipitation, filters through the refuse and produces a toxic leachate composed of organic and inorganic molecules. Available oxygen is initially consumed and further waste decomposition progresses anaerobically. Anaerobic bacterial fermentation produces organic alcohols and acids as byproducts. Additionally, metals are reduced to their ionic state.

The invention consists of a biological system for treatment of sanitary landfill leachate with the primary functional detoxifying embodiments being leachate tolerant plant micro-organisms, and cationic exchange sites on organic media. A leachate tolerant plant, reed canary grass (*Phalaris grundinacea*) was selected for use because of its effective absorption of heavy metals into its tissues, its tolerance to saturated environment, as well as production of oxygen as part of its natural metabolic activities. The organic carbon compounds of the leachate solution attenuate poorly in most soils, and are therefore prone to migrate in groundwater. However, organic compounds provide a substrate for microbial growth in the living-filter system.

DESCRIPTION OF THE PREFERRED EMBODIMENT

Figure 1:
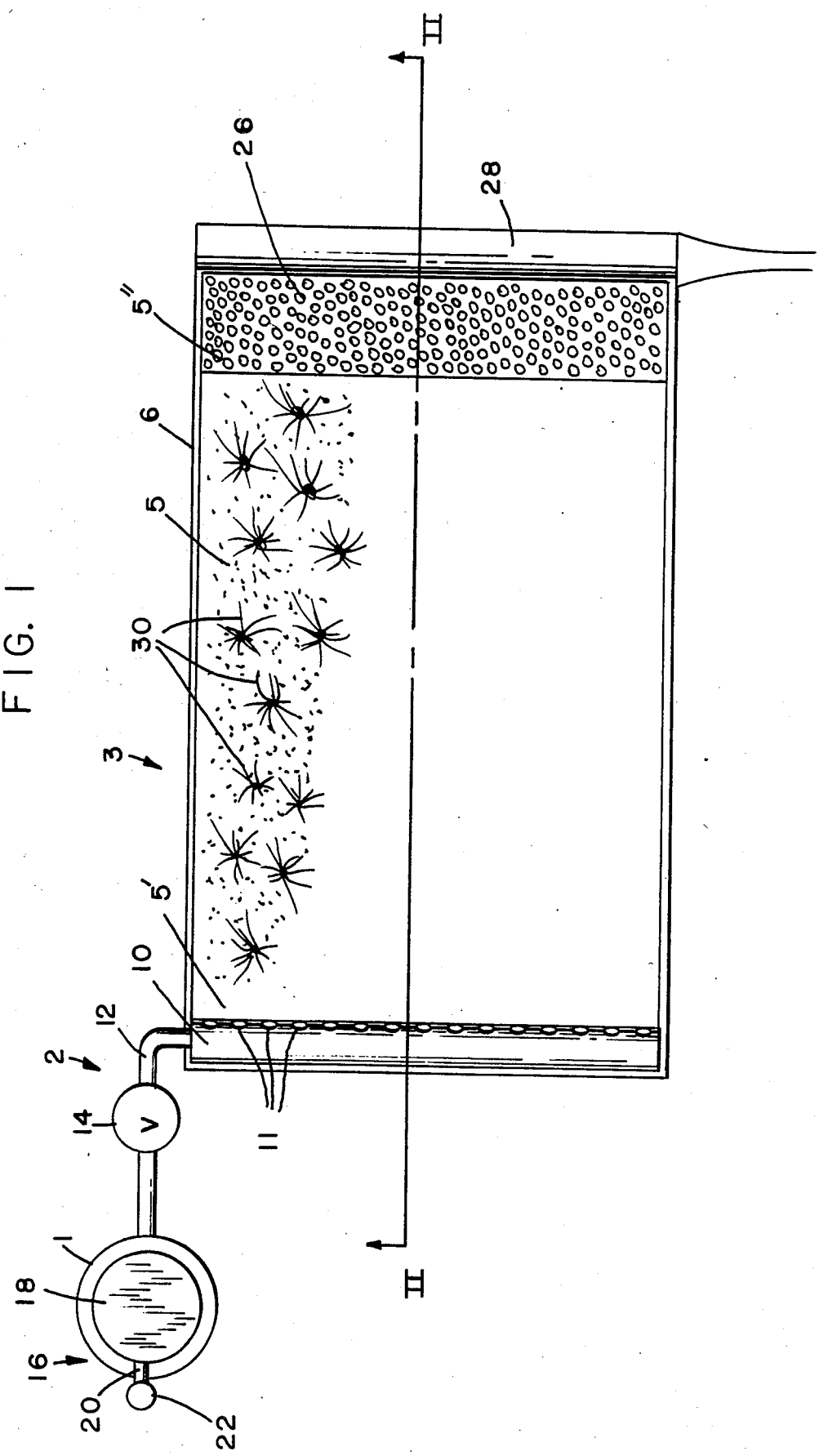
FIG. 1 is a plan view of the leachate treating system of the present invention.
Figure 2:
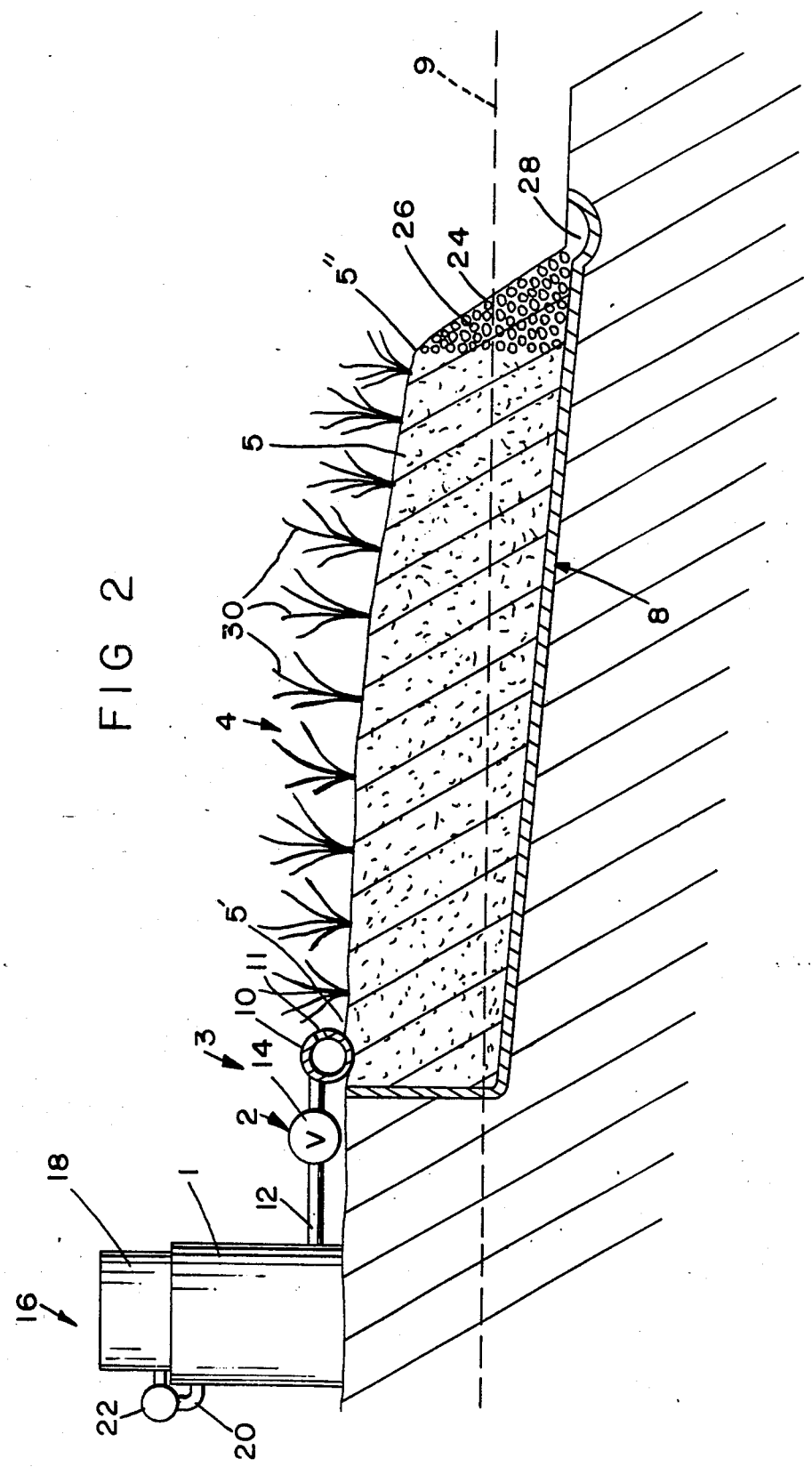
FIG. 2 is a vertical cross-sectional view of the system, taken along the line II—II of FIG. 1.

Referring to the drawings, the leachate treatment system of the present invention, generally indicated by the reference numeral 3, is shown as having a sanitary landfill leachate supply source which may be in the form of a storage container 1 or a collection system from an appurtenant sanitary landfill operation. The leachate supply source is shown as a storage container 1 in the drawings. However, the supply source may also consist of a storage lagoon which collects and stores leachate from the landfill. The treatment system 3 also includes a treatment plot, generally indicated by the reference numeral 4, which is operatively connected to the storage container 1 by flow control apparatus, generally indicated by the reference numeral 2.

The treatment plot 4 comprises a basin 8, a water impervious liner which covers the contour of the basin and a treatment medium 5. If the basin is located in soil which has good drainage properties it is preferred that the liner consists of a plastic sheet. Asphalt membrane, or clay membrane. However, the liner can also consist of hardpan, fragipan or other similar soil which has poor drainage properties. The treatment medium 5 comprises a mixture of soil and or peat and slopes gradually downward from a high end 5' to a low end relative to a horizontal plane 9. The treatment medium can consist of a mixture of sand and peat. However, pure peat is preferred. In the preferred form of the invention, the entire basin 8 slopes downwardly from the high end 5' to the low end 5", and has a width and length of 50' and 100' respectively. It is preferred that the treatment medium have a thickness of between 18"-24" but not more than 24".

The flow control apparatus 2, includes a leachate distribution tube 10 which extends across the width of the treatment medium at the high end 5' of the medium. The tube 10 has a plurality of apertures 11 along its entire length so that leachate is distributed evenly from the tube across the width of the treatment medium. The tube 10 is connected to the storage container 1 by a conduit 12. Flow of leachate from the container 1 is controlled by a valve 14 in the conduit 12. The concentration of the leachate in the storage tank 18 is controlled by a water balance system which is generally indicated by the reference numeral 16 and includes a storage water tank 18 which is situated on top of the leachate storage container 1. Water from the tank 18 flows to the container 1 through a water conduit 20 and the rate of flow is controlled by a flow control valve 22.

The low end 5" of the treatment medium 5 includes a section of relatively large particulate material such as stones and gravel 26 which forms a drainage slope 24. The angle of the drainage slope 24 is considerably greater than the relatively gentle slope of the treatment medium 5. The slope 24 extends down to the edge of a collection trough 28.

Flow Rates

The leachate flow rate is a function of the organic carbon concentration, and the size of the treatment plot. The kinetics of leachate treatment dictate approximately 24 hours of detention time. For a continuous plug flow reactor, with first order kinetics $$\bar{t} = \frac{1}{k}\left(\ln \frac{C_O}{C_e}\right),$$

where $C_O$ equals the influent concentration, $C_e$ the effluent concentration, and k the rate constant. We can see clearly from the equation that $\bar{t}$ becomes a dependent variable if a particular $C_e$ is desired (say 99% removal). To provide a particular $\bar{t}$ one merely controls either the distance of flow, or velocity of flow - using the elementary relationship of D=R·t, or $\bar{t}$=D/R. As the distance or length of travel increases, so does $\bar{t}$. If the rate of flow (velocity) increases by using a faster application rate, or by increasing the slope of the reactor, then $\bar{t}$ decreases. Conversely lesser slopes and lower application rates increase $\bar{t}$. From a practical field point of view, each treatment plot has its application rate fixed by all of the other variables. As a rough approximation, a treatment plot of 50'×100', with 2' of peat, and a slope of 4½'/100 ft. (5 feet to 5") should be able to provide 99% removal of organic material with an application rate of approximately 10,000 gal./day. An application rate of 5,000 gal./day, would provide a 2x factor of safety.

As an example, a treatment plot in New England 43" precip./year), an acre of landfill can produce up to 3,000 gal./day of leachate, so in rough numbers, the treatment plot described would service about an acre of landfill. This means that approximately 1/10 of a landfill site should be set aside for leachate treatment.

The treatment medium is seeded with leachate tolerant plants 30. There are several types of plants or grasses which are tolerant of water in general and leachate in particular. However, reed canary grass (Phalaris grundinacea) is the preferred leachate plant of this invention. Like many other water tolerant plants, canary grass has the ability to pump $O_2$ into its roots to enable the plant to metabolize and survive in a wet environment.

During operation of the invention, leachate from the storage container is applied to the high end 5' of the treatment medium 5 from the tube 10. The leachate penetrates the medium 5 vertically and horizontally and eventually drains through the gravel or the coarse material 26 along the drainage slope 24 into the collection through 28. The adjustments which are built into the treatment system 3 enable the proper parameters of the system to be set. These parameters establish a steady state biologically-living treatment system which is effective to treat the leachate so that the leachate which is collected in the trough 28 is environmentally safe. An optimum microbial and plant population must be maintained for a steady state system. Such a system depends on facts such as: the peat and soil composition of the treatment medium 5, the dimensions and slope of the treatment plot 4, the application rate of the leachate to the treatment plot, and the concentration of the leachate. The quality of the leachate at the trough 28 also depends on the flow rate of the leachate through the treatment plot and the treatment time within the plot as well as a properly balanced system. The treatment time of the leachate in the treatment medium 5 is equal to the volume of the "reactor" divided by its flow rate. The "reactor" volume for treatment purposes is a function of the pore volume and the % saturation of the pores with leachate. Water balance methods can be used to determine the pore volume that is actually being utilized for leachate treatment. The leachate application per unit time is dependent on the utility of the field treatment plot 4. The utility is assessed relative to the interactions of the concentration of organic carbon compounds, typical metabolites being acetic acid and propionic acid, the rate of leachate application, and the time required to reduce the concentration of organic compounds in the leachate solution to an environmentally safe level. The concentration of organic carbon compounds in the untreated leachate will fluctuate relative to: the leachate water content, which will vary according to precipitation; evaporation of leachate water; transpiration by leachate tolerant plants 30; and volatilization of organics. Fluctuations in concentration of organic carbon compounds relative to water content changes can be corrected to effect the efficient operation of the treatment system 3 by means of the water balance system 16 prior to leachate application to the field treatment plot 4.

The leachate tolerant plants 30 which are seeded and growing on the field treatment plot 4 function to minimize erosion from the field treatment plot 4 upon application of the leachate. Erosion may be seen to occur relative to the horizontal plane 8 of the field treatment plot and the rate of leachate application. Additionally, the leachate tolerant plants 30 improve the hydraulic properties of the organically enriched treatment medium 5. The filter function of the leachate tolerant plants 30 relates to their metabolic pathways which utilize heavy metals. The metabolic pathways cause the oxidation and plant tissue absorption of heavy metals from the leachate solution. Reed canary grass (*Phalgris grundinacea*) is the preferred leachate tolerant plant of this invention, but the efficient operation of the biological living-filter system 3 is not limited to this specific plant, as one may utilize an alternate having the characteristics described above. The viability of the leachate tolerant plants 30 is crucial for the efficient operation of the biological living-filter system 3. A significant depression in the pH of the leachate solution must be adjusted for, by means of liming, if appropriate, to the field treatment plot.

The organically enriched treatment medium 5 fosters the growth of faculative microorganisms, where the organically enriched treatment medium 5 functions to remove cations during ripening of the microbial population. The organically enriched treatment medium 5 must be compatible with the variable environments of soil systems. Peat moss is the preferred organically enriched treatment medium, but efficient operation of the biological living-filter system 3 is not limited to this specific organically enriched treatment medium, as one may utilize an alternate having the characteristic described above.

The field treatment medium 5 provides a high surface area which enhances the growth of the micro-organism population. An optimum percentage of pore volume in the soil system also enhances microbial growth. Ideally, a steady state condition is desired for the microbial population, serving to enhance the efficient operation of the treatment process. The filter function of the microbial population relates to their metabolic pathways which utilize organic carbon compounds in the leachate solution as a substrate. The metabolic pathways cause the oxidation of the organic carbon compounds to carbon dioxide and water. The metabolism of the microbial population causes some consumption of the organically enriched treatment medium 5, which must be adjusted to prevent release of cations.

The metabolic byproducts and treated leachate of the biological living-filter system for treatment of sanitary landfill leachate produce little or no negative environmental impact.

It is obvious that minor changes may be made in the form and construction of the invention without departing from the material spirit thereof. It is not, however, desired to confine the invention to the exact form herein shown and described, but it is desired to include all such forms as properly come within the scope claimed.

The invention having been thus described, what is claimed as new and desired to secure by Letters Patent is:

1. System for treating landfill leachate comprising:
    (a) a leahate supply source,
    (b) a treatment basis which slopes from a high end to a low end, and which includes a water impervious liner,
    (c) a particulate treatment medium which includes peat moss to provide a substantially large surface area to enhance the fixation and proliferation of microbes and to support plants for growth,
    (d) leachate tolerant plants growing in the treatment medium,
    (e) inlet flow control means operatively connected to the leachate supply and the treatment basin and comprising:
        (1) a perforated tube at the high end of the treatment medium which extends across the width of the treatment medium,
        (2) a conduit connecting one end of the tube to the leachate supply source, and
        (3) a flow control valve in the conduit for introducing leachate to the upper portion of the treatment medium at the high end of said treatment basin which allows the leachate to penetrate and flow vertically and horizontally through the treatment medium, and
    (f) outlet flow control means for draining the treated leachate from the treatment medium at the low end of the basin and for collecting the drained treated leachate at a point below said treatment medium said outlet flow control means comprising:
        (1) a collection trough at the low end of said basin and below said treatment medium, and
        (2) a drainage medium of relatively large coarse particles between the treatment medium and the collection trough.

2. System for treating landfill leachate as recited in claim 1, wherein said basin is a depression in the earth and said liner is made of plastic.

3. System for treating landfill leachate as recited in claim 1, wherein said plants comprise reed canary grass.

4. System for treating landfill leachate as recited in claim 1, wherein said treatment medium comprises a mixture of peat moss and sand.

5. System for treating leachate as recited in claim 1, wherein said leachate supply source comprises:
    (a) a storage container which collects and stores leachate from a landfill, and (b) a water balance system which is operatively connected to the storage container for controlling the concentration of the leachate in the storage container.

6. System for treating leachate as recited in claim 5, wherein said water balance system comprises:

(a) a storage tank for water, (b) a water conduit which is operatively connected to said storage tank and to said storage container, and (c) a flow control valve in said water conduit.

7. System for treating leachate as recited in claim 1, wherein said treatment medium has a thickness of less than 24".

8. System for treating leachate as recited in claim 7, wherein said treatment medium has a thickness in the range of 18" to 24".

* * * * *